United States Patent
Arimoto et al.

(10) Patent No.: US 8,305,574 B2
(45) Date of Patent: Nov. 6, 2012

(54) ANALYZER

(75) Inventors: Kimihiko Arimoto, Kyoto (JP); Kunio Ohtsuki, Kyoto (JP); Yoko Nakai, Kyoto (JP)

(73) Assignee: Horiba, Ltd. (JP)

( * ) Notice: Subject to any disclaimer, the term of this patent is extended or adjusted under 35 U.S.C. 154(b) by 178 days.

(21) Appl. No.: 12/858,709

(22) Filed: Aug. 18, 2010

(65) Prior Publication Data

US 2011/0043792 A1    Feb. 24, 2011

(30) Foreign Application Priority Data

Aug. 18, 2009    (JP) .................................. 2009-189434
Aug. 11, 2010    (JP) .................................. 2010-179954

(51) Int. Cl.
*G01J 3/427*    (2006.01)
(52) U.S. Cl. ...................................................... 356/319
(58) Field of Classification Search .................. 356/319, 356/213, 417, 445
See application file for complete search history.

(56) References Cited

U.S. PATENT DOCUMENTS
2004/0046963 A1*    3/2004    Lackritz et al. ............... 356/445

FOREIGN PATENT DOCUMENTS
JP    59-70946 A    4/1984
JP    2003-294609 A    10/2003
JP    2005-164255 A    6/2005

* cited by examiner

*Primary Examiner* — Tarifur Chowdhury
*Assistant Examiner* — Abdullahi Nur
(74) *Attorney, Agent, or Firm* — Cantor Colburn LLP (57) ABSTRACT

This invention is to make the detection sensitivities as even as possible among a plurality of specimens to be inspected in an analyzer that leads light transmitted from the plurality of specimens to be inspected to a single spectrometer via optical fibers, the analyzer includes first and second light guide members provided for every first and second specimen to be inspected so as to lead the light obtained from each of the specimens to be inspected to a photo-detecting part, and light projection side end portions of a plurality of optical fiber elements composing the first and second light guide members are arranged in mixture.

3 Claims, 6 Drawing Sheets

ANALYZER

TECHNICAL FIELD

The present invention generally relates to an analyzer, and in particular to an analyzing apparatus for analyzing a sample contained in a specimen to be inspected by leading light transmitted from the specimen to be inspected such as a measurement cell and the like to a photo-detecting part to detect the light.

BACKGROUND ART

As a conventional spectroscopic analyzer, as disclosed in Patent Literature 1, there is adapted to have a configuration such that light from a light source is transferred via a single-core optical fiber to a sample in a measurement cell to be irradiated with the light and that the light transmitted through the sample is transferred to a spectrometer via a single-core optical fiber.

Also, as disclosed in Patent Literature 2 or 3, there is adapted to have a configuration such that transmitted light from a plurality of measurement cells are transferred to a single spectrometer to analyze a sample contained in each of the measurement cells.

However, in such a configuration that the transmitted light from the measurement cells are transferred to a single spectrometer, the light transferred from the optical fibers are incident to different positions in an incident slit of the spectrometer, and there arises a problem that each detection sensitivity is different every optical fiber.

PATENT LITERATURE

Patent Literature 1: JP2005-164255A
Patent Literature 2: JP-A-Showa 59-70946
Patent Literature 3: JP2003-294609A

SUMMARY OF INVENTION

Technical Problem

Therefore, the present invention has been made to solve these problems at a burst and an essential object thereof is to make the detection sensitivities as even as possible among a plurality of specimens to be inspected in an analyzer in which the light transmitted from the plurality of specimens to be inspected is led to a single spectrometer via optical fibers.

Solution to Problem

That is, an analyzer according to one aspect of the present invention includes: a plurality of first optical fiber elements each receiving light obtained from a first specimen to be inspected by a light incident side end portion thereof and projecting the light from a light projection side end portion thereof; a plurality of second optical fiber elements each receiving light obtained from a second specimen to be inspected by a light incident side end portion thereof and projecting the light from a light projection side end portion thereof; and a photo-detecting part adapted to detect the light projected from the light projection side end portions of the first optical fiber elements and the light projected from the light projection side end portions of the second optical fiber elements, wherein the light projection side end portions of the first optical fiber elements and the light projection side end portions of the second optical fiber elements are arranged in mixture with each other.

With this configuration as described above, it becomes possible to lead the light from the first and second specimens to be inspected to a single photo-detecting part so that the analyzer can be reduced in cost with reduction in installation places and installation time. Also, in this case, since the light projection side ends of the first and second optical fiber elements are arranged in mixture with each other, the light led to the photo-detecting part can be substantially uniform every first and second specimens to be inspected, and the detection sensitivities can be made as uniform as possible among the specimens to be inspected.

Figure 6:
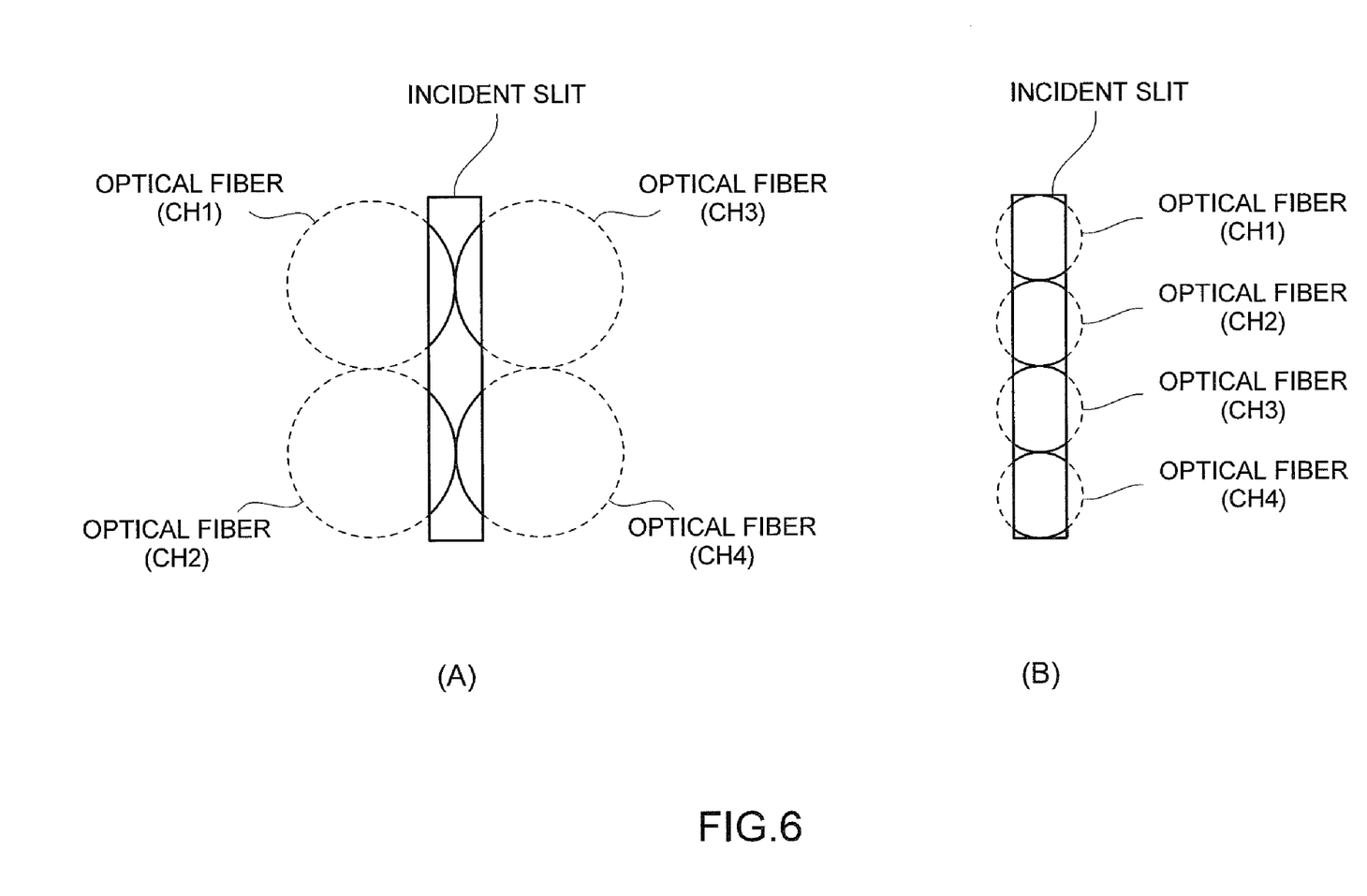
FIG. 6 is a schematic diagram showing a conventional arrangement of optical fibers in an incident slit.

In this configuration, in the case where the transmitted light is transferred from the first and second measurement cells to the spectrometer via a plurality of single-core optical fibers, arrangement aspects of the light projection end surfaces of the single-core optical fibers are in a manner, for example, as shown in FIGS. 6(A) and 6(B).

However, in the case of an arrangement as shown in FIG. 6(A), each of the optical fibers lies off the edge of the incident slit, and there arises a problem that a light intensity of the light transferred via the optical fibers is largely lost. Moreover, since each of the optical fibers is not arranged in a central portion in a longitudinal direction of the incident slit but is biased in position from the central portion thereof, there arises a problem that the detection sensitivity is deteriorated.

Meanwhile, in the case of an arrangement as shown in FIG. 6(B), although a loss of light intensity is improved, there is a problem that the detection sensitivity is different for every optical fiber. That is, the detection sensitivity is different depending on the position of the optical fiber in the incident slit and there is a problem that detection sensitivities of the optical fibers located on top and bottom edges of the incident slit are lower than that of the optical fiber located in the vicinity of the central portion in the longitudinal direction of the incident slit.

In order to appropriately solve this problem, it is preferable that, the photo-detecting part includes a spectrometer for dispersing light passed through an incident slit and a photo-detector for detecting the light dispersed by the spectrometer, wherein the first and second optical fiber elements lead light respectively obtained from the first and second specimens to be inspected to the incident slit, and wherein a diameter of each of the first and second optical fiber elements is smaller than a slit width of the incident slit, and the light projection end faces of the first and second optical fiber elements have substantially the even density in location in the vicinity of the central portion in the longitudinal direction of the incident slit.

With this arrangement, since the first and second optical fiber elements are bundled in mixture so that the light from the light projection end surface thereof are led to the incident slit, the light from the specimens to be inspected to be introduced into the incident slit can be increased with reduction in difference of light intensity between the first and second specimens to be inspected. Moreover, since the light projection end surfaces of the respective optical fiber elements are located substantially in the even density in the vicinity of the central portion in the longitudinal direction of the incident slit, the light intensities in the central portion in the longitudinal direction of the incident slit can be made uniform without being biased for every first and second specimens to be inspected, whereby the detection sensitivities can be made substantially the even for every first and second specimens to be inspected. In addition, since the light from the first and second specimens to be inspected can be led to the central portion in the longitudinal direction of the incident slit, the light from the specimens to be inspected can be detected by a line sensor without using an expensive two-dimensional sensor as the photo-detector.

In order to efficiently transfer the light from the first and second specimens to be inspected to the first and second optical fiber elements and make it possible to switch the light from the first and second specimens to be inspected, it is preferable to provide: a first single-core fiber connected to the first specimen to be inspected, thereby transferring the light from the first specimen to be inspected to the first optical fiber elements; a second single-core fiber connected to the second specimen to be inspected, thereby transferring the light from the second specimen to be inspected to the second optical fiber elements; and a switching mechanism interposed between the each single-core fibers and the each optical fiber elements, thereby blocking or opening a space between a light projection end face of each of the single-core fibers and a light incident end face of each of the optical fiber elements so that the light from any one of the first and second specimens to be inspected is led to the photo-detecting part. Thus, the use of the single-core fibers and the optical fiber elements necessarily forms connected parts in structure therebetween. By utilizing these connected parts, the switching mechanism can be easily provided while saving the loss of light intensity as much as possible.

Advantageous Effects of Invention

According to the present invention configured as described above, the detection sensitivities can be made as even as possible between the first and second specimens to be inspected in the spectroscopic analyzer in which the light transmitted from the first and second specimens to be inspected are led to a single spectrometer via optical fibers.

DESCRIPTION OF EMBODIMENTS

The following describes one embodiment of a spectroscopic analyzer as an example of an analyzer according to the present invention referring to the accompanying drawings.

In a spectroscopic analyzer 100 according to the present embodiment, a sample held in each of measurement cells 3 is irradiated with light and the light transmitted through the sample is dispersed by spectroscope to thereby measure a spectrum thereof so that an absorbance or a light transmittance of the sample is qualitatively or quantitatively analyzed.

Figure 1:
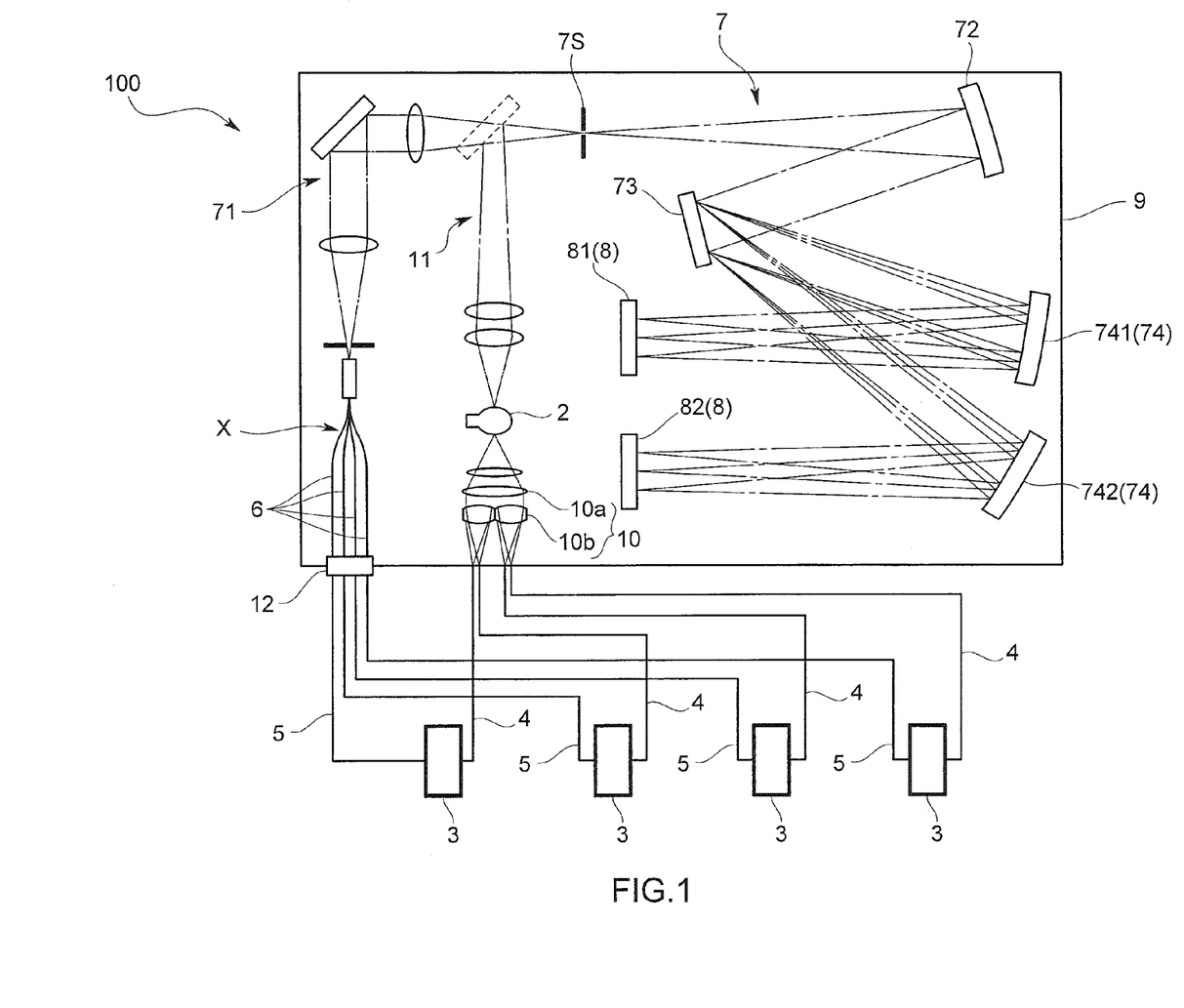
FIG. 1 is a schematic configuration diagram of a spectroscopic analyzer according to one embodiment of the present invention.

Specifically, as shown in FIG. 1, the spectroscopic analyzer 100 includes a light source 2, a plurality of measurement cells 3 in which different samples are respectively held, a plurality of first optical fibers 4 for transferring light from the light source 2 to the measurement cells 3 respectively, a plurality of second optical fibers 5 for transferring the light transmitted through the measurement cells 3, a plurality of light guide members 6 for transferring the light from the second optical fibers 5 to an incident slit 7S, a spectrometer 7 for dispersing the light transferred from the light guide members 6, and a photo-detector 8 for detecting the light dispersed by the spectrometer 7. In this configuration, the light source 2, the light guide members 6, the spectrometer 7 and photo-detector 8 are accommodated within a casing 9 to configure a main body of the analyzer. The main body of the analyzer is connected with the plurality of measurement cells 3 via the first and second optical fibers 4 and 5.

The light source 2 is a continuous spectrum light source including, for example, a halogen lamp and the like, and a condensing optical system 10 is arranged in a light radiation direction of the light source. Reference numeral 11 in FIG. 1 denotes a reference optical system for measuring reference light by directly leading the light from the light source 2 to the spectrometer 7.

The condensing optical system 10 is interposed between the light source 2 and the first optical fibers 4 so as to condense the light from the light source 2 to the first optical fibers 4. The condensing optical system 10 includes one or more condenser lenses 10a for forming parallel light from the light generated by the light source 2 and a fly-eye lens 10b for condensing the light passed through the condenser lens 10a to be inputted to a light incident end surface of each of the first optical fibers 4. The fly-eye lens 10b is a lens array formed of the same single lenses arranged in lows and columns in a matrix shape. By using the fly-eye lens 10b having such a rectangular lens section in which single lenses are arranged without a gap, the loss of light from the light source 2 can be suppressed so that the light can be efficiently led to each of the first optical fibers 4.

Each of the plurality of measurement cells 3 has the same configuration and one of the opposite side thereof is connected with a light projection end of the first optical fiber 4 and the other of the opposite side is connected with a light incident end of the second optical fiber 5. In this arrangement, the first and second optical fibers 4 and 5 are connected with the measurement cell 3 in a manner such that a light projection end face of the first optical fiber 4 is opposed to a light incident end face of the second optical fiber 5. In the present embodiment, by providing the first to fourth measurement cells 4, four pairs of the first and second optical fibers 4 and 5 are provided.

The light incident end of each of the first optical fibers 4 is connected to the casing 9 of the main body of the analyzer so that the first optical fiber 4 transfers the light condensed by the condensing optical system 10. In the present embodiment, each of the first optical fibers 4 is a single-core fiber independently provided for every measurement cell 3.

The light incident end of each of the second optical fibers 5 is connected to each measurement cell 3 and the light projection end thereof is connected to the casing 9 of the main body of the analyzer via a switching mechanism 12 to be described later so that the second optical fiber 5 transfers the light transmitted through the measurement cell 3 to the light guide member 6. In the present embodiment, similarly to the first optical fibers 4, each of the second optical fibers 5 is a single-core fiber independently provided for every measurement cell 3.

Figure 2:
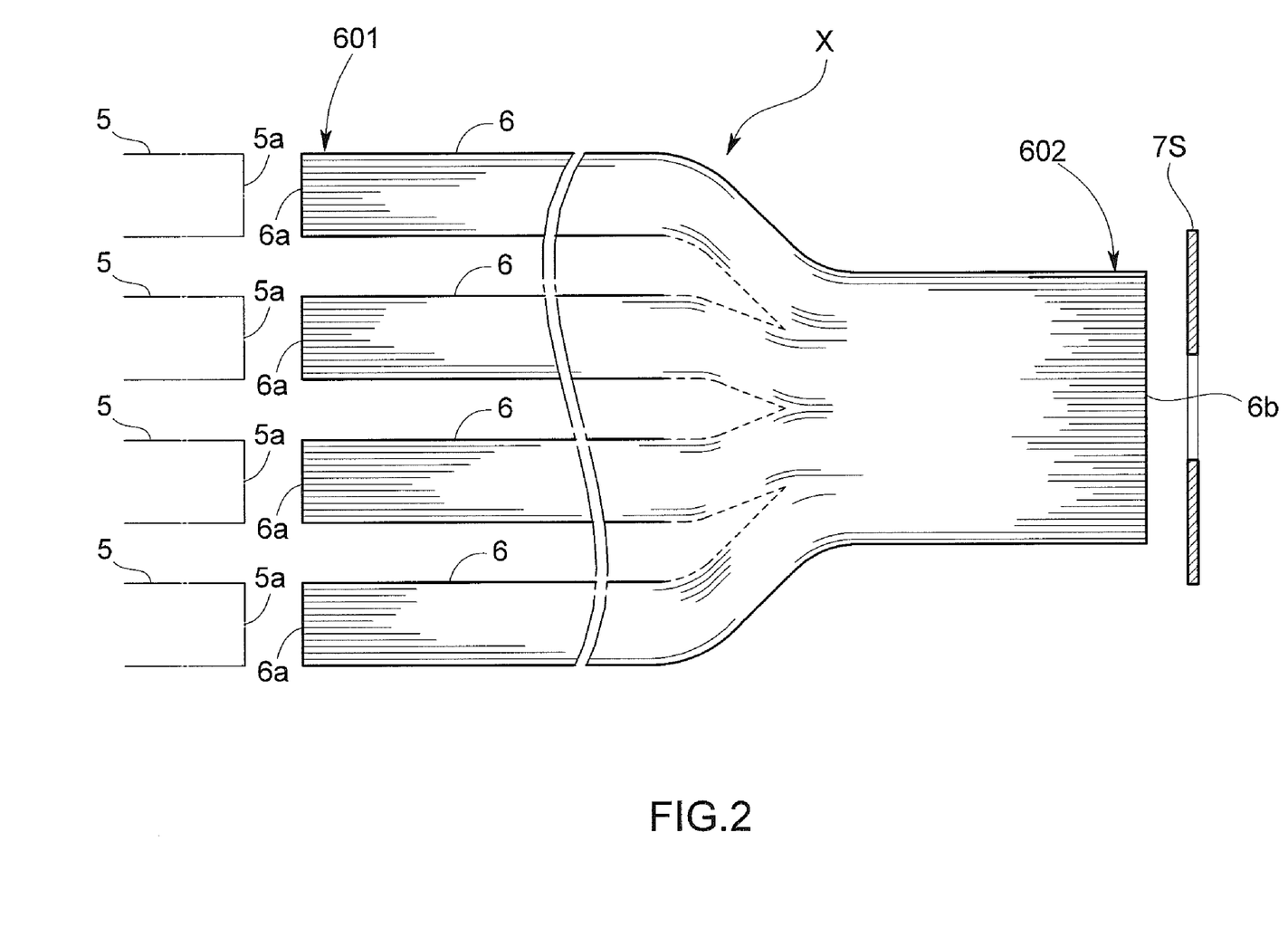
FIG. 2 is a side view schematically showing a light guide member in the same embodiment.

The light guide members 6, as shown in FIG. 2, are formed of so-called a multi-core fiber that transfers the light transmitted from the measurement cells 3 via the second optical fibers 5 to the incident slit 7S of the spectrometer 7. A light incident end 601 of each of the light guide members 6 is provided for every second optical fiber 5 and the light incident end face 6a thereof is opposed to a light projection end face 5a of a corresponding second optical fiber 5. Each of the light guide members 6 includes by bundling the plurality of optical fiber elements and a light incident end face of each optical fiber element is arranged to be substantially coplanar to form a light incident end face 6a of each light guide member 6. In this arrangement, a diameter of each optical fiber element is smaller than a slit width of the incident slit 7S to be described later. In the present embodiment, the first to fourth light guide members 6 are provided for the first to fourth measurement cells 3, respectively.

A light projection end portions 602 of the light guide members 6 provided for every second optical fibers 5 (measurement cells 3) are formed for transferring the light to one incident slit 7S of one spectrometer 7, and as shown in FIG. 2, light projection end faces 6b thereof are arranged to be substantially coplanar and tied into a bundle. Specifically, the light projection side end portions 602 of the optical fiber elements composing each of the light guide members 6 are bundled in mixture at random. The light projected from the light projection side end portions 602 are condensed into the incident slit 7S of the spectrometer 7 by a light collection optical system 71.

The spectrometer 7 is provided for forming spectra by spectroscope of the light transferred via the light guide members 6, and includes the incident slit 7S, a first concave mirror 72 for reflecting and collimating the light, a diffraction grating 73 for dispersing the light collimated by the first concave mirror 72, and a second concave mirror 74 for condensing the light dispersed by the diffraction grating 73 and leading the resultant light to the photo-detector 8. In the present embodiment, an ultraviolet light detector 81 and a near infrared light detector 82 are provided for the photo-detector 8, and the second concave mirror 8 includes a concave mirror 741 for condensing light to the ultraviolet light detector 81 and a concave mirror 742 for condensing light to the near infrared light detector 82.

The ultraviolet light detector 81 and the near infrared light detector 82 are multichannel detectors and line CCD sensors each of which is configured by arranging CCDs in a line. By using a line CCD sensor, the cost of the photo-detector can be reduced compared to a case of using a two-dimensional CCD sensor. Based on a detection signal obtained by the photo-detector 8, an absorbance or a light transmittance and the like is calculated by an operation control unit (computer) although not shown.

Thus, in the present embodiment, the light projection end portion 602 which is a mixture portion of the light guide members 6 is formed by mixing the optical fiber elements composing the plurality of (first to fourth) light guide members 6, at random without distinction among the light guide members 6 so that the detection sensitivities of the light injected via the respective light guide members 6 are substantially identical. More specifically, the light projection side end portions of the optical fiber elements derived from the respective measurement cells 3 are arranged in mixture with each other, and the optical fiber elements composing the plurality of light guide members 6 are arranged in mixture with each other so that the detection sensitivity by one line CCD sensor serving as the photo-detector 8 can be made substantially identical among the light guide members 6.

Figure 3:
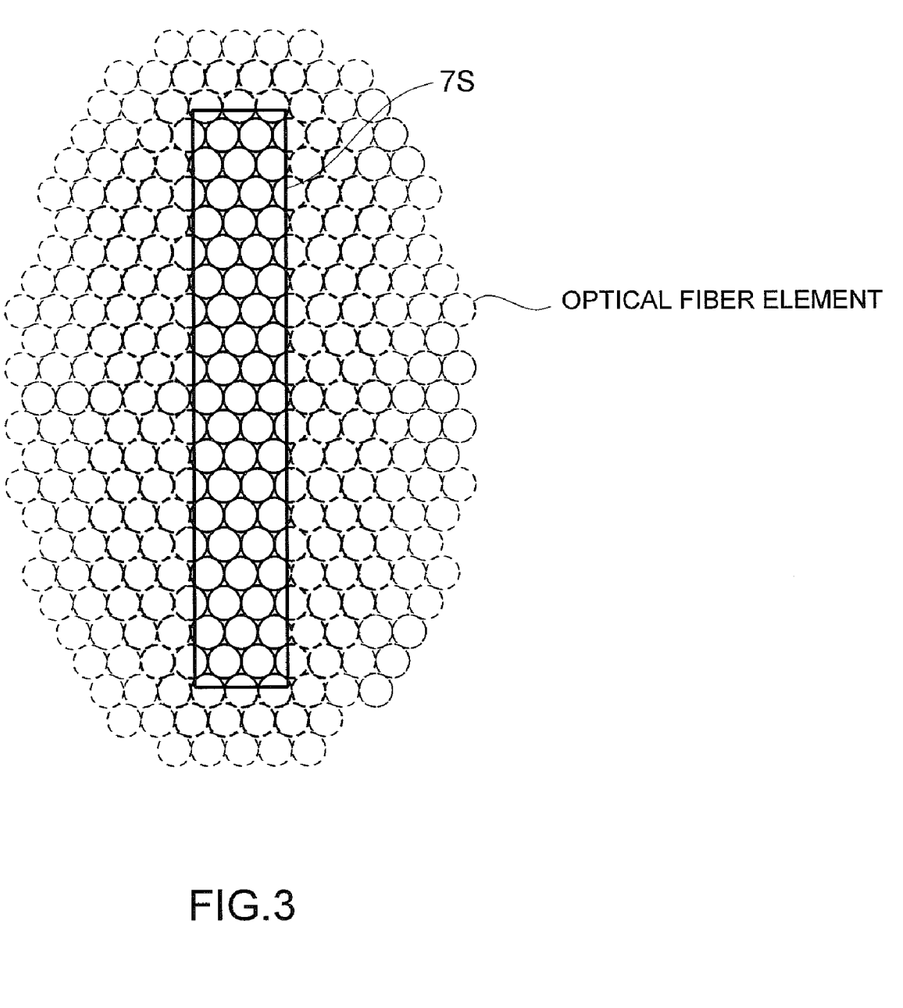
FIG. 3 is a front view schematically showing a positioning relation of an incident slit and the light guide member in the same embodiment.

That is, the light projection end portion 602 is adapted to have a configuration such that the density in location of images of the light projection end faces of the optical fiber elements composing the light guide members 6 within the incident slit 7S is substantially uniform among the light guide members 6 when viewed from an opening direction of the incident slit 7S. More specifically, it is configured such that the density in location of images of the light projection end faces of the optical fiber elements of the light guide members 6 is substantially uniform in the vicinity of the central portion in a longitudinal direction in the incident slit 7S among the light guide members 6. Thus, by bundling the light projection side end portions of the plurality of light guide members 6, there can be configured a light condensing member X that leads the light transmitted from the plurality of specimens 3 to be inspected to a single photo-detecting part (spectrometer 7 and photo-detector 8).

The spectroscopic analyzer 100 according to the present embodiment includes the switching mechanism 12 that leads light transmitted through any one of the plurality of measurement cells 3 to the spectrometer 7.

Figure 4:
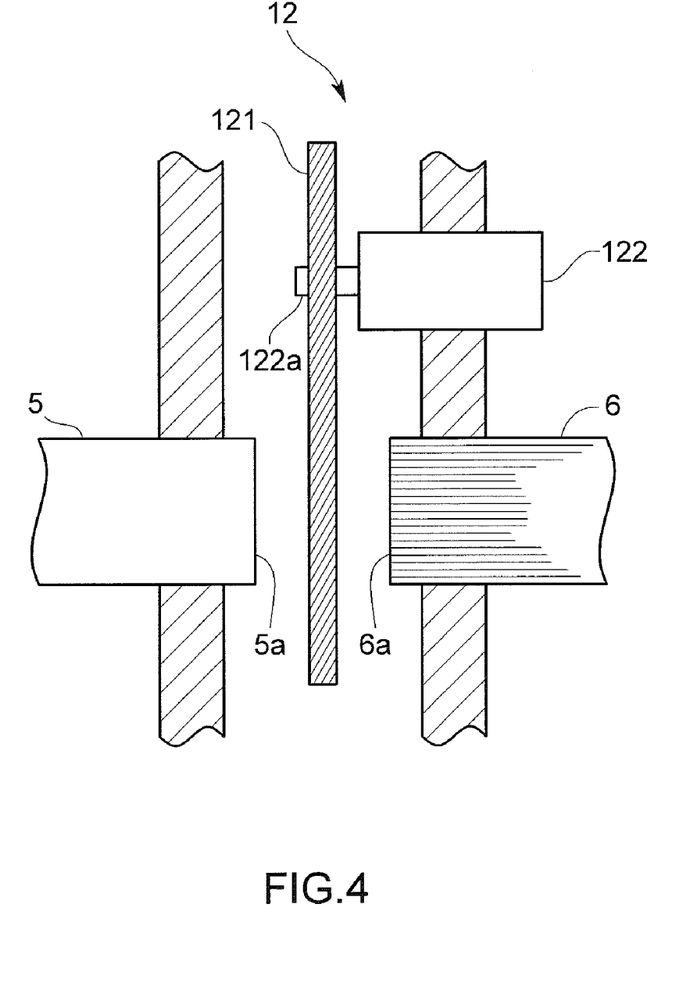
FIG. 4 is a schematic diagram showing a single-core fiber, a light guide member, a connected part and a switching mechanism in the same embodiment.

This switching mechanism 12 is interposed between the second optical fibers 5 of the single-core fibers and the light guide members 6 so that the space defined between the light projection end faces 5a of the second optical fibers 5 and the light incident end faces 6a of the light guide members 6 are blocked or opened to thereby lead light from any one of the plurality of measurement cells 3 to the incident slit 7S of the spectrometer 7.

Figure 5:
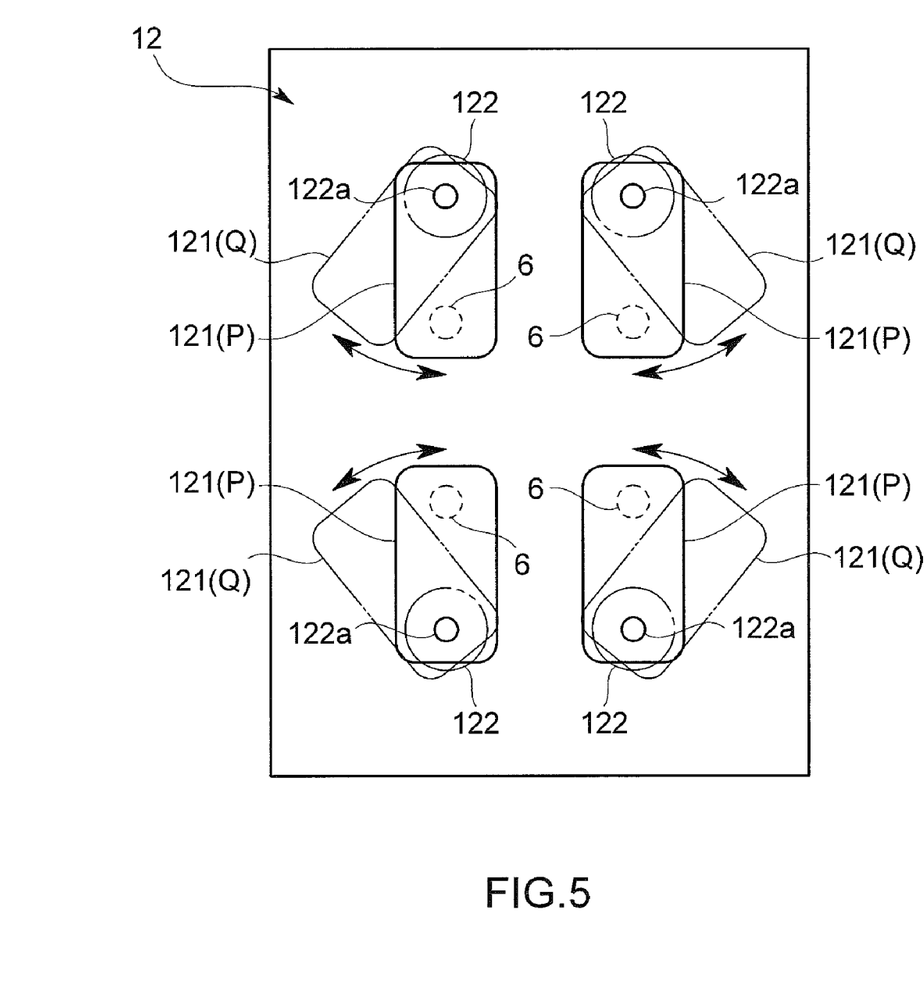
FIG. 5 is a front view schematically showing a switching mechanism in the same embodiment.

The switching mechanism 12 is capable of independently blocking and opening each of the second optical fibers 5 and each of the light guide members 6, and as shown in FIG. 5, the switching mechanism 12 includes a plurality of movable plates 121 (e.g., four in the present embodiment) each provided for every interposition between each of the second optical fibers 5 and each of the light guide members 6 and a plurality of drive units 122 each of which moves a corresponding movable plate 121 between a blocking position P for blocking the space between the light projection end face 5a of each of the second optical fibers 5 and the light incident end face 6a of each of the light guide members 6 and an opening position Q for opening the space between the light projection end face 5a of each of the second optical fibers 5 and the light incident end face 6a of each of the light guide members 6.

The drive unit 122 in the present embodiment is a rotary solenoid that rotatably moves the movable plate 121 between the blocking position P and the opening position Q. This rotary solenoid includes a rotating shaft 122a including a permanent magnet, a yoke (not shown) provided around the rotating shaft 122a, and an induction coil (not shown) wound around the yoke, wherein the movable plate 121 is fixed to the rotating shaft 122a. When the rotary solenoid is excited, a magnetic pole generated in the yoke and the permanent magnet are repulsed to each other to rotate the rotating shaft 122a so that the movable plate 121 is rotated and fixed to one of the blocking position P and the opening position Q. Meanwhile, at the time of the non-excitation, the yoke and the permanent magnet are pulled to each other to rotate the rotating shaft 122a so that the movable plate 121 is rotated and fixed to the other of the blocking position P and the opening position Q. By configuring the switching mechanism 12 in this way, it becomes possible to fix in selectively positioning the movable plate 121 between the two positions P and Q without using an external force by such as a spring. Moreover, since a rotary solenoid having a quick response speed is used as the drive unit 122, it is possible to quickly switch between the two positions P and Q. In addition, a low cost can be attained by reducing the number of components and a working stability can be achieved by reducing failure factors. Furthermore, the switching mechanism 12 is arranged between the second optical fibers 5 and the light guide members 6 so that the light from the light source 2 is irradiated into the measurement cells 3 all the time during measurement, and therefore it is easy to check a malfunction such as a leakage of light in a course from the light source 2 to the measurement cells 3.

<Effect of the Present Embodiment>

According to the spectroscopic analyzer 100 according to the present embodiment as configured like this, it is possible to disperse and detect the light from the plurality of measurement cells 3 using the single spectrometer 7 and therefore the cost of the spectroscopic analyzer 100 can be reduced and the space and time for installation thereof can be reduced.

Moreover, since the optical fiber elements composing the plurality of light guide members 6 are bundled in mixture so that the light from the light projection end faces 6b is led to the incident slit 7S, the error in light intensity among the respective measurement cells 3 can be reduced while increasing the light quantity from the measurement cells 3 to be introduced to the incident slit 7S.

Furthermore, since the density in location of the light projection end faces 6b of the optical fiber elements is substantially uniform in the vicinity of the central portion in the longitudinal direction in the incident slit 7S, the light intensity can be made substantially uniform at the central portion in the longitudinal direction of the incident slit 7S, and the detection sensitivity can be made substantially identical every measurement cell 3.

In addition, since the light from the respective measurement cells 3 can be led to the central portion in the longitudinal direction of the incident slit 7S, the light can be detected by the line CCD sensor without using an expensive two-dimensional CCD sensor as the photo-detector 8.

It is noted that the present invention should not be limited to the embodiment mentioned above.

For example, although the light guide member is configured by bundling the optical fiber elements to have contours substantially identical to that of the second optical fiber, the number or arrangement of the optical fiber elements may be decided to configure each of the light guide member in agreement with the size of the incident slit. In specific, the optical fiber elements may be bundled in accordance with a shape of the slit (e.g., rectangular) so that the optical fiber elements do not lie off the edge of the slit when viewed from the opening direction thereof. With this configuration, the number of the optical fiber elements can be reduced, thereby reducing the cost.

In the present embodiment, although the optical fiber elements are bundled in mixture at random in the mixture portion of the light guide members, the optical fiber elements may be regularly mixed.

In the present embodiment, although the first to fourth light guide members are provided for the respective first to fourth specimens to be inspected and the light projection side end portions of the optical fiber elements composing the first to fourth light guide members are mixed together in arrangement, the number of the pairs of the specimens to be inspected and the light guide members is not limited to four, but two or more pairs thereof may be provided.

Moreover, in the present embodiment, although the ultraviolet light detector and the near infrared light detector are provided for the photo-detector, the photo-detector may be constituted with use of any one of the light detectors, and also three or more kinds of light detectors may be used.

Furthermore, in the present embodiment, although the photo-detecting part includes the spectrometer and the photo-detector, it may include an optical system other than the spectrometer and the photo-detector or may include only the photo-detector.

In addition, in the present embodiment, although the specimen to be inspected is a measurement cell, other subject to be inspected may be used, for example, as an end-point monitor as a processing chamber of a semiconductor processing unit for an etching device and the like.

It is noted that the present invention should not be limited to the embodiments mentioned above, and various changes within the scope are possible without departing from the spirit of the invention.

REFERENCE SIGNS LIST

100 . . . Analyzer (spectroscopic analyzer)
3 . . . Specimen to be inspected (measurement cell)
5 . . . Single-core fiber (second optical fiber)
5a . . . Light projection end face of single-core fiber
6 . . . Light guide member (a plurality of optical fiber elements)
6a . . . Light incident end face of light guide member
7 . . . Spectrometer
7S . . . Incident slit
8 . . . Photo-detector
12 . . . Switching mechanism

The invention claimed is:

1. An analyzer comprising:
a plurality of first optical fiber elements each receiving light obtained from a first specimen to be inspected by a light incident side end portion thereof and projecting the light from a light projection side end portion thereof;
a plurality of second optical fiber elements each receiving light obtained from a second specimen to be inspected by a light incident side end portion thereof and projecting the light from a light projection side end portion thereof; and
a photo-detecting part adapted to detect the light projected from the light projection side end portions of the first optical fiber elements and projected from the light projection side end portions of the second optical fiber elements, wherein
the light projection side end portions of the first optical fiber elements and the light projection side end portions of the second optical fiber elements are arranged in mixture with each other.

2. The analyzer according to claim 1, wherein the photo-detecting part includes a spectrometer for dispersing light passed through an incident slit and a photo-detector for detecting the light dispersed by the spectrometer, and
wherein the first and second optical fiber elements lead the light respectively obtained from the first and second specimens to be inspected to the incident slit, and wherein a diameter of each of the first and second optical fibers is smaller than a slit width of the incident slit, and the light projection end faces of the first and second optical fiber elements have substantially the even density in location in the vicinity of the central portion in a longitudinal direction of the incident slit.

3. The analyzer according to claim 1 comprising:
a first single-core fiber connected to the first specimen to be inspected, thereby transferring the light from the first specimen to be inspected to the first optical fiber elements;

a second single-core fiber connected to the second specimen to be inspected, thereby transferring the light from the second specimen to be inspected to the second optical fiber elements; and a switching mechanism interposed between the first and second single-core fibers and the first and second optical fiber elements, thereby blocking or opening a space between a light projection end face of each of the single-core fibers and a light incident end face of each of the optical fiber elements so that the light from any one of the first and second specimens to be inspected is led to the photo-detecting part.

* * * * *